US012766967B2

(12) United States Patent
Candir et al.

(10) Patent No.: US 12,766,967 B2
(45) Date of Patent: Oct. 20, 2026

(54) VEHICLE ELECTRICAL SYSTEM FOR A MOTOR VEHICLE, AND METHOD

(71) Applicant: MERCEDES-BENZ GROUP AG, Stuttgart (DE)

(72) Inventors: Akin Candir, Filderstadt (DE); Urs Boehme, Ehningen (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 505 days.

(21) Appl. No.: 18/292,495

(22) PCT Filed: Jul. 26, 2022

(86) PCT No.: PCT/EP2022/070950
§ 371 (c)(1),
(2) Date: Jan. 26, 2024

(87) PCT Pub. No.: WO2023/006751
PCT Pub. Date: Feb. 2, 2023

(65) Prior Publication Data

US 2024/0343120 A1 Oct. 17, 2024

(30) Foreign Application Priority Data

Jul. 27, 2021 (DE) ..................... 10 2021 003 844.4

(51) Int. Cl.
*H01M 10/44* (2006.01)
*B60L 3/00* (2019.01)
(Continued)

(52) U.S. Cl.
CPC ............. *B60L 3/0069* (2013.01); *B60L 50/66* (2019.02); *B60L 53/16* (2019.02); *B60Y 2200/91* (2013.01)

(58) Field of Classification Search
CPC .......... B60L 53/16; B60L 53/14; B60L 50/66; B60L 50/60; B60L 3/0069; H02J 7/00
(Continued)

(56) References Cited

U.S. PATENT DOCUMENTS 7,626,396 B2 12/2009 Lindsey et al.
12,422,464 B2 * 9/2025 Orner ..................... G01R 31/14
(Continued)

FOREIGN PATENT DOCUMENTS

DE 102018004109 A1 1/2019
DE 102017218586 A1 4/2019
(Continued)

OTHER PUBLICATIONS

International Search Report and Written Opinion mailed Nov. 21, 2022 in related/corresponding International Application No. PCT/EP2022/068325.
(Continued)

*Primary Examiner* — Edward Tso
(74) *Attorney, Agent, or Firm* — PATENT PORTFOLIO BUILDERS PLLC

(57) ABSTRACT

A vehicle electrical system for a motor vehicle includes a high-voltage battery for providing a positive potential and a negative potential and a high voltage load. An insulation monitor monitors insulation resistances to a vehicle ground galvanically isolated from the vehicle electrical system. Between the positive potential and the vehicle ground and between the negative potential and the vehicle ground, a Y capacitor is provided in each case. A voltage center tap between the positive potential and the negative potential, which voltage center tap is present in the vehicle electrical system or in a component of the vehicle electrical system, is connected to the vehicle ground by an ohmic coupling resistor.

7 Claims, 10 Drawing Sheets

Figure 1:
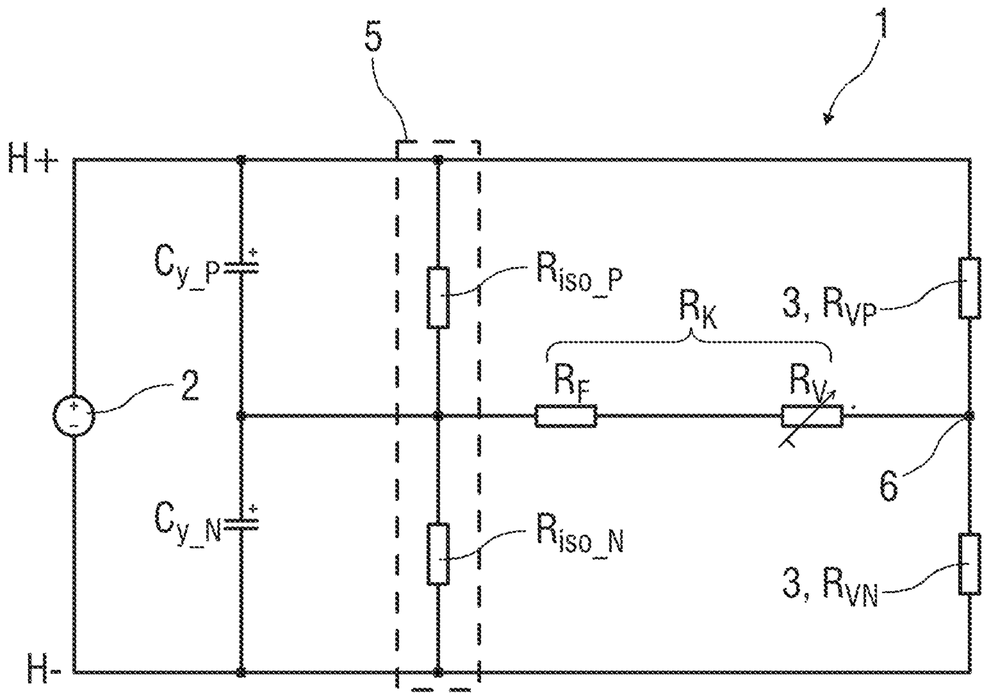

(51) Int. Cl.
*B60L 50/60* (2019.01)
*B60L 53/16* (2019.01)
*H01M 10/46* (2006.01)

(58) Field of Classification Search
USPC ................. 320/104, 107, 132, 116, 157, 166
See application file for complete search history.

(56) References Cited

U.S. PATENT DOCUMENTS

| | | | | |
|---|---|---|---|---|
| 2013/0258531 | A1 | 10/2013 | Li et al. | |
| 2020/0127469 | A1* | 4/2020 | Haindl | B60K 28/14 |
| 2022/0057443 | A1 | 2/2022 | Trunk | |

FOREIGN PATENT DOCUMENTS

| | | | | |
|---|---|---|---|---|
| DE | 102018211625 | A1 | 1/2020 | |
| DE | 102019202892 | A1 | 9/2020 | |
| DE | 102020102658 | A1 | 8/2021 | |
| DE | 102021003180 | A1 | 8/2021 | |
| EP | 3640076 | A1 * | 4/2020 | B60L 3/12 |

OTHER PUBLICATIONS

International Search Report and Written Opinion mailed Nov. 24, 2022 in related/corresponding International Application No. PCT/EP2022/070950.
Office Action created Apr. 26, 2022 in related/corresponding DE Application No. 10 2021 003 844.4.
Office Action created Jul. 14, 2022 in related/corresponding DE Application No. 10 2021 003 843.6.
Search Report created Apr. 12, 2022 in related/corresponding DE Application No. 10 2021 003 843.6.
Notice of Allowance mailed Aug. 13, 2025 in related/corresponding U.S. Appl. No. 18/292,401.

* cited by examiner

VEHICLE ELECTRICAL SYSTEM FOR A MOTOR VEHICLE, AND METHOD

BACKGROUND AND SUMMARY OF THE INVENTION

Exemplary embodiments of the invention relate to a vehicle electrical system for a motor vehicle.

DE 10 2019 202 892 A1 discloses a vehicle electrical system arrangement for a motor vehicle, the vehicle electrical system arrangement having a high-voltage energy store for providing a first high-voltage potential and a second high-voltage potential that is different from the first, so that a total voltage can be tapped between the first and the second high-voltage potential. Furthermore, the vehicle electrical system arrangement has a first insulation resistance between the first high-voltage potential and a predetermined electrical ground as well as a second insulation resistance between the second high-voltage potential and the predetermined electrical ground, as well as an insulation monitoring device which is designed to monitor the first and second insulation resistances. The HV (high-voltage) vehicle electrical system of an electric vehicle typically at least consists of one HV battery with battery contactors and HV loads, for example a pulse inverter.

As a rule, the high-voltage vehicle electrical system is implemented as an IT (isolé terre) network and is therefore completely galvanically isolated from the vehicle ground. However, parasitic resistances in the cables, HV loads, the battery and so on result in a high-impedance connection between the positive or negative high-voltage potential and the vehicle ground, the so-called insulation resistance, or the respective first and second insulation resistances mentioned above. As long as this resistance is high-impedance, i.e., in the megaohm range, there is no hazard. For safety reasons, this insulation resistance is permanently monitored by means of an insulation monitoring device, also referred to as insulation monitor. If a defined threshold value is fallen below, a warning can be generated and, depending on the operating state, the HV vehicle electrical system can be disconnected from the battery via the battery contactors and a safe state can be established.

In addition to the insulation resistance, there are capacitors in every HV vehicle electrical system, in particular so-called ground capacitors, which lie between the HV connections and the vehicle ground. These result from parasitic effects, for example caused by cable shields, and are even deliberately installed in order to improve EMC (electromagnetic compatibility) behavior. According to the formula $E=\frac{1}{2}\times C\times U^2$, energy E is stored in these capacitors with capacity C when voltage U is applied. If a person then touches a high-voltage contact and the vehicle ground at the same time, these capacitors are discharged or recharged via the body and could, in principle, i.e., if these currents were too high, lead to a hazard.

In order to minimize the hazard potential, there are therefore different standards containing limit values for the maximum permitted stored, or rather effective, energy in the capacitors. This directly results in a limitation of the maximum permissible total capacity depending on the total HV voltage. In addition, for safety reasons, the worst-case scenario must be assumed and a maximum asymmetrical HV vehicle electrical system must be assumed, which occurs when the voltage of an HV pole measured against ground corresponds to almost the total HV voltage. This can occur, inter alia, due to dirt resistances or leakage currents over the service life.

Due to the limitation of the maximum permissible total capacity described above, there is no hazard potential even with an asymmetrical vehicle electrical system, i.e., if the voltages between the positive high-voltage potential and the ground and between the negative high-voltage potential and the ground are different. In addition to the disadvantage of limiting the maximum permissible total capacity, it can also occur in this case, i.e., in the case of an asymmetrical vehicle electrical system, that when connecting the vehicle, for example via the DC charging interface, to a charging station, the positive or negative voltage potential, relative to ground, of the charging station and vehicle is different. This can lead to undesired, undefined compensating processes when the charging station is switched on, which in the worst-case scenario can prevent charging.

Exemplary embodiments of the invention are directed to an improved vehicle electrical system for a motor vehicle, in particular for an electrically powered motor vehicle.

A vehicle electrical system according to the invention for a motor vehicle comprises at least one HV battery for providing a positive potential and a negative potential and at least one HV load, wherein an insulation monitor for monitoring insulation resistances to a vehicle ground galvanically isolated from the vehicle electrical system is provided, wherein between the positive potential and the vehicle ground and between the negative potential and the vehicle ground a Y capacitor is provided in each case. According to the invention, a voltage center tap between the positive potential and the negative potential, which voltage center tap is present in the vehicle electrical system or in a component of the vehicle electrical system, is connected to the vehicle ground by means of an ohmic coupling resistor. The insulation monitor can be designed, for example, as a resistance insulation monitor.

As a result of the solution according to the invention, the deviation of the distribution of the potentials from a symmetrical distribution is very small. This means that the energy content/charge stored in the Y capacitors is thus always very close to the achievable minimum. This means that a larger Y capacitor can be permitted in the vehicle electrical system, while still meeting the legal requirements regarding stored energy/charge. More cost-effective and/or better EMC filtering in the components of the high-voltage vehicle electrical system is therefore possible.

According to the invention, the voltage center tap lies between two resistors connected as a voltage divider or is formed by a capacitive voltage divider.

According to the invention, the coupling resistor is designed as a series connection consisting of a fixed resistor and a variable resistor.

In one embodiment, the resistors of the voltage divider are designed as HV loads connected in series or as internal resistors of at least two HV batteries connected in series.

In one embodiment, the resistors of the voltage divider are substantially smaller compared to the coupling resistor and measuring resistors of the insulation monitor, which is designed as a resistance insulation monitor.

In one embodiment, the measuring resistors and the coupling resistor are in the range of more than 100 kohms.

In one embodiment, at least one from the following list is coupled to the vehicle ground via the coupling resistor:

- a series connection of HV voltage supplies for a control board,
- a series connection of half-bridges and/or H-bridges,
- a multilevel half-bridge,
- a series connection of inverters,
- a multilevel inverter, a heating circuit with series connections of two or more heating elements, a tap of a connection point of battery module series connections.

In an alternative embodiment, the coupling resistor can also be formed from a fixed resistor and a variable resistor.

The vehicle electrical system can be part of a motor vehicle, in particular an electrically powered motor vehicle.

If the coupling resistor is designed as a series connection consisting of the fixed resistor and the variable resistor, this means that a high variable resistance can be set when the vehicle is not connected to a DC charging station, while a lower variable resistance is set when the vehicle is connected to a DC charging station.

Embodiments of the invention are explained in more detail below with reference to drawings.

BRIEF DESCRIPTION OF THE DRAWING FIGURES

Figure 2:
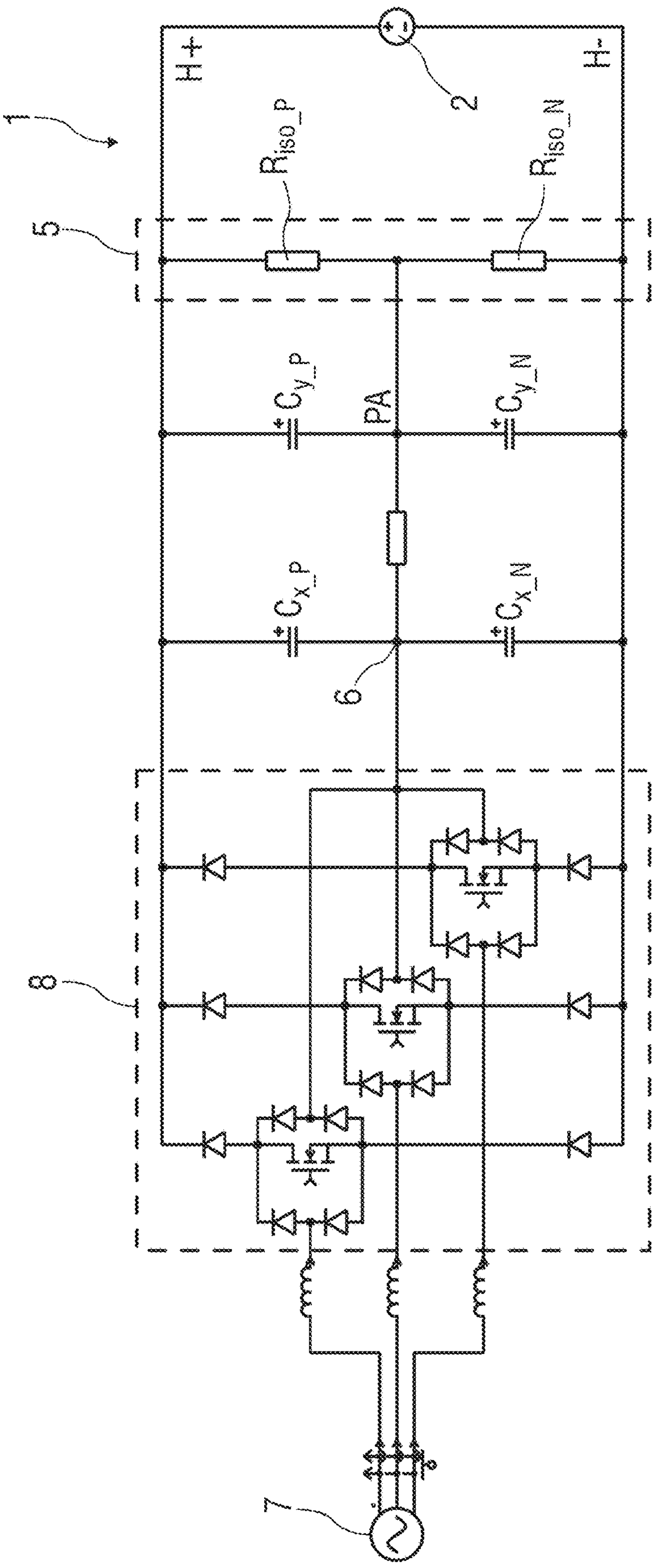
Figure 3:
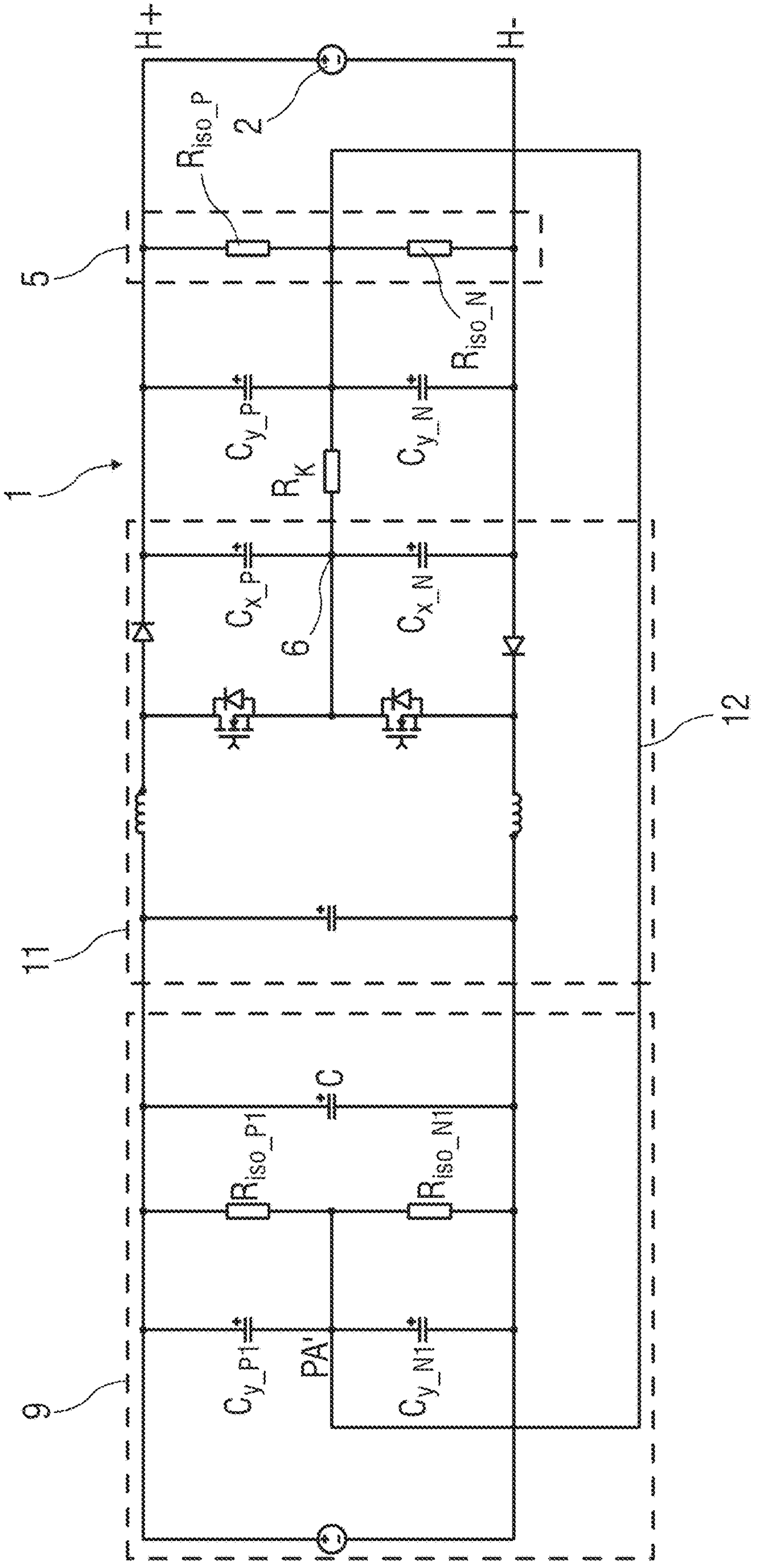
Figure 4:
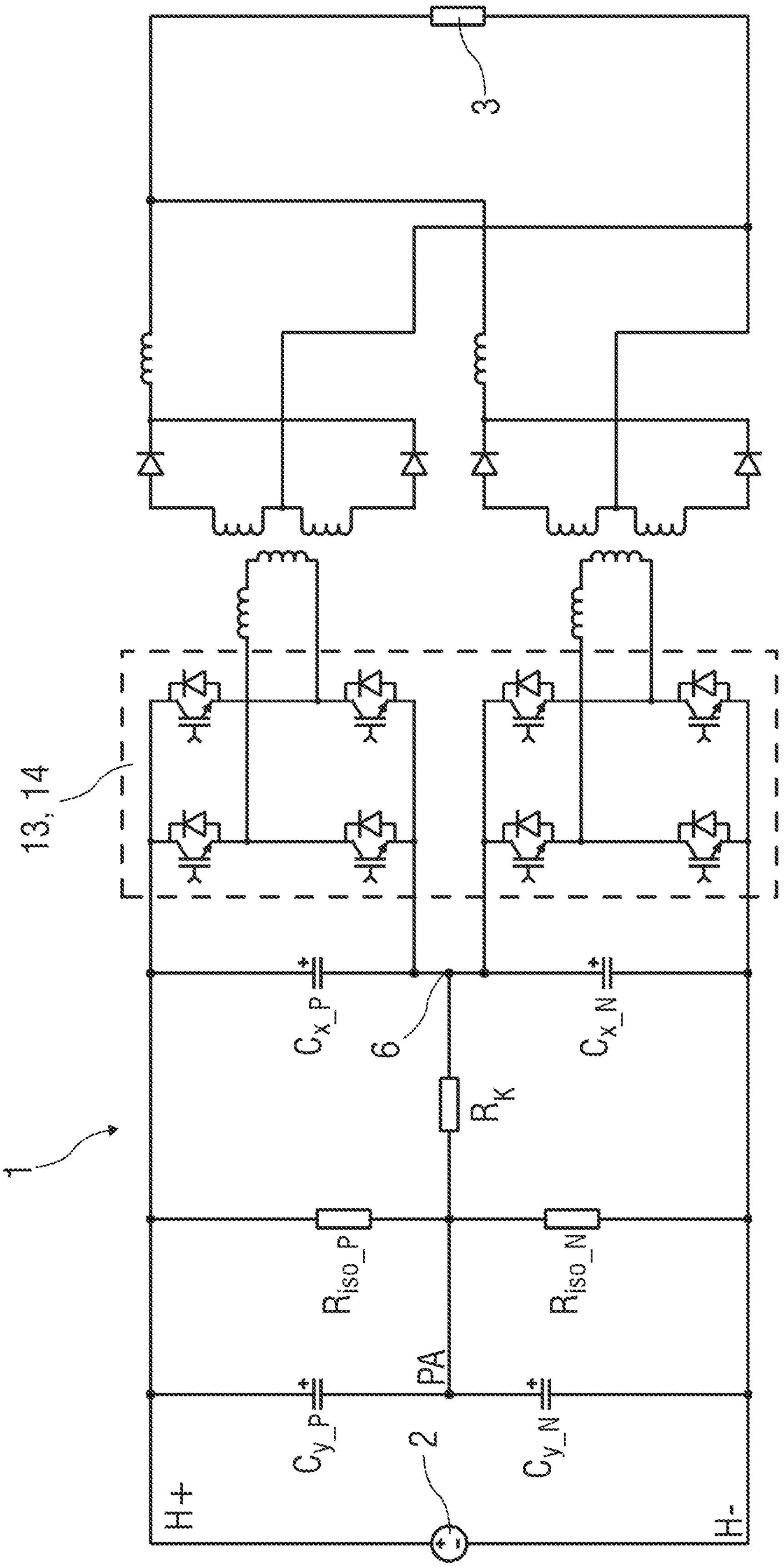
Figure 5:
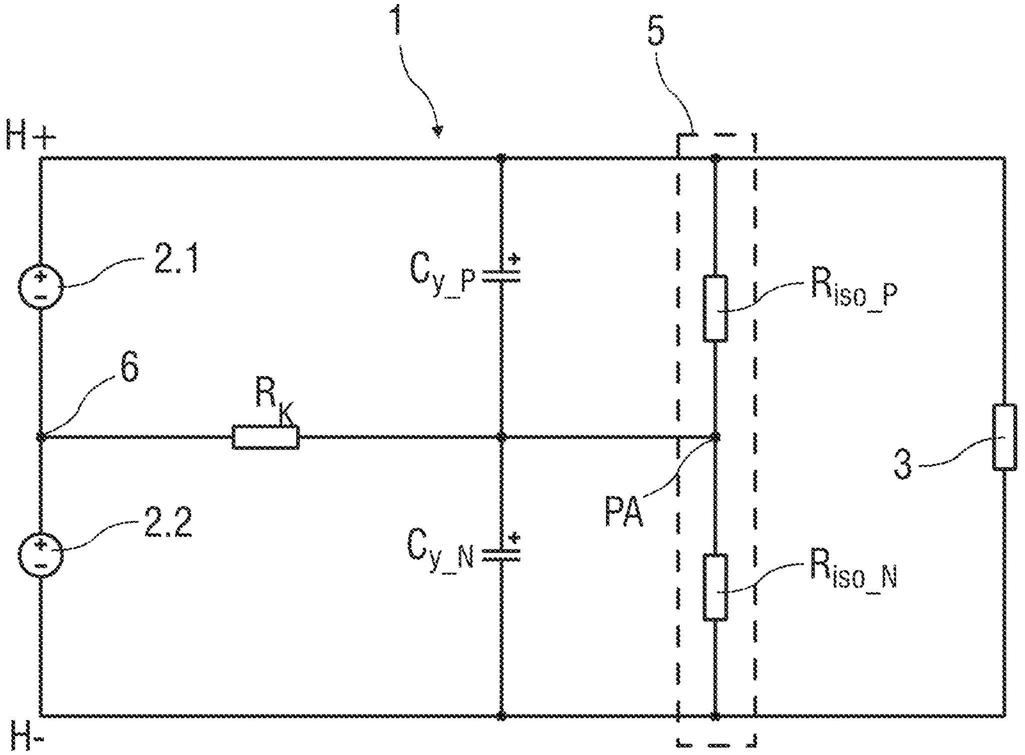
Figure 6:
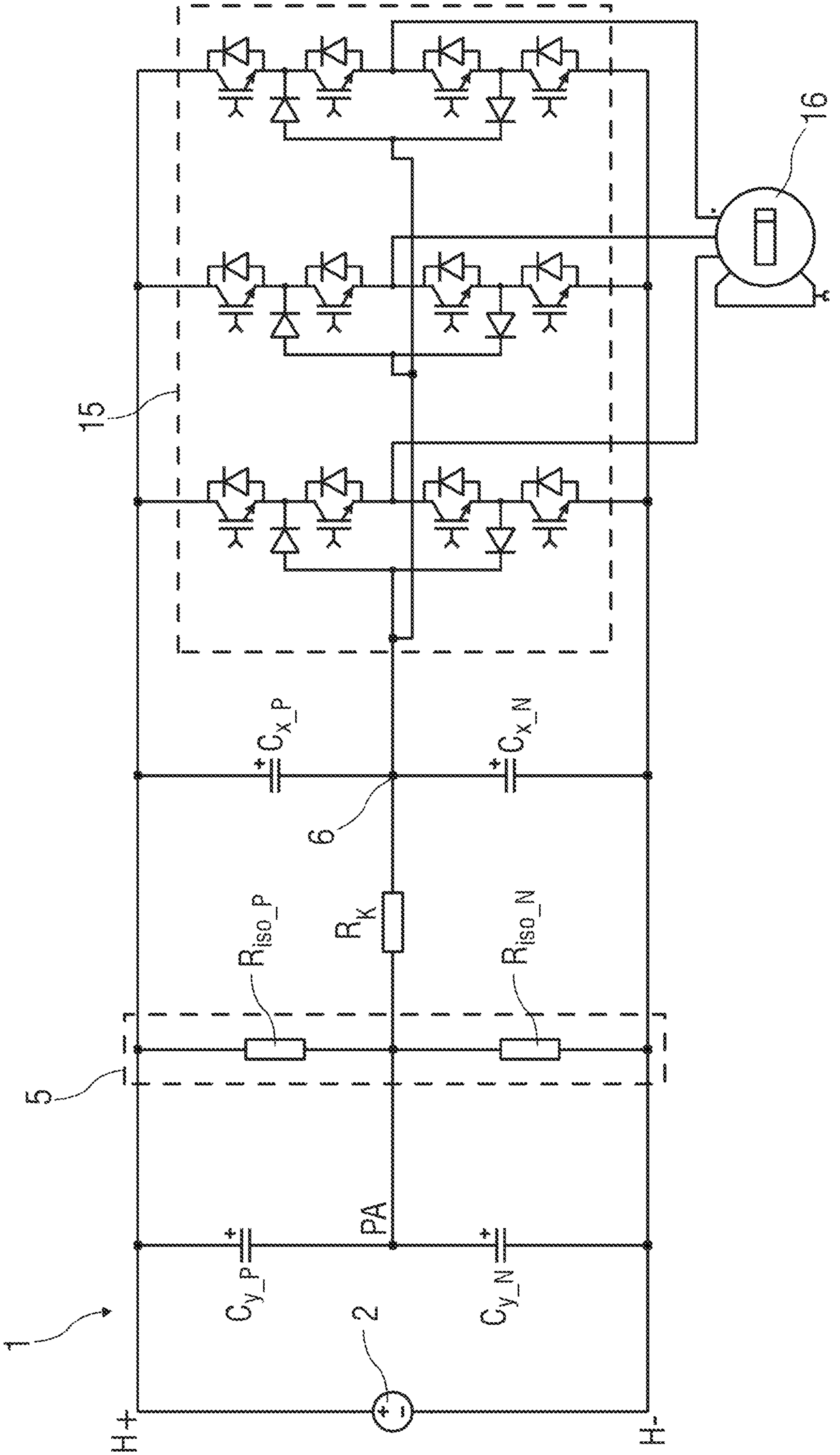
Figure 7:
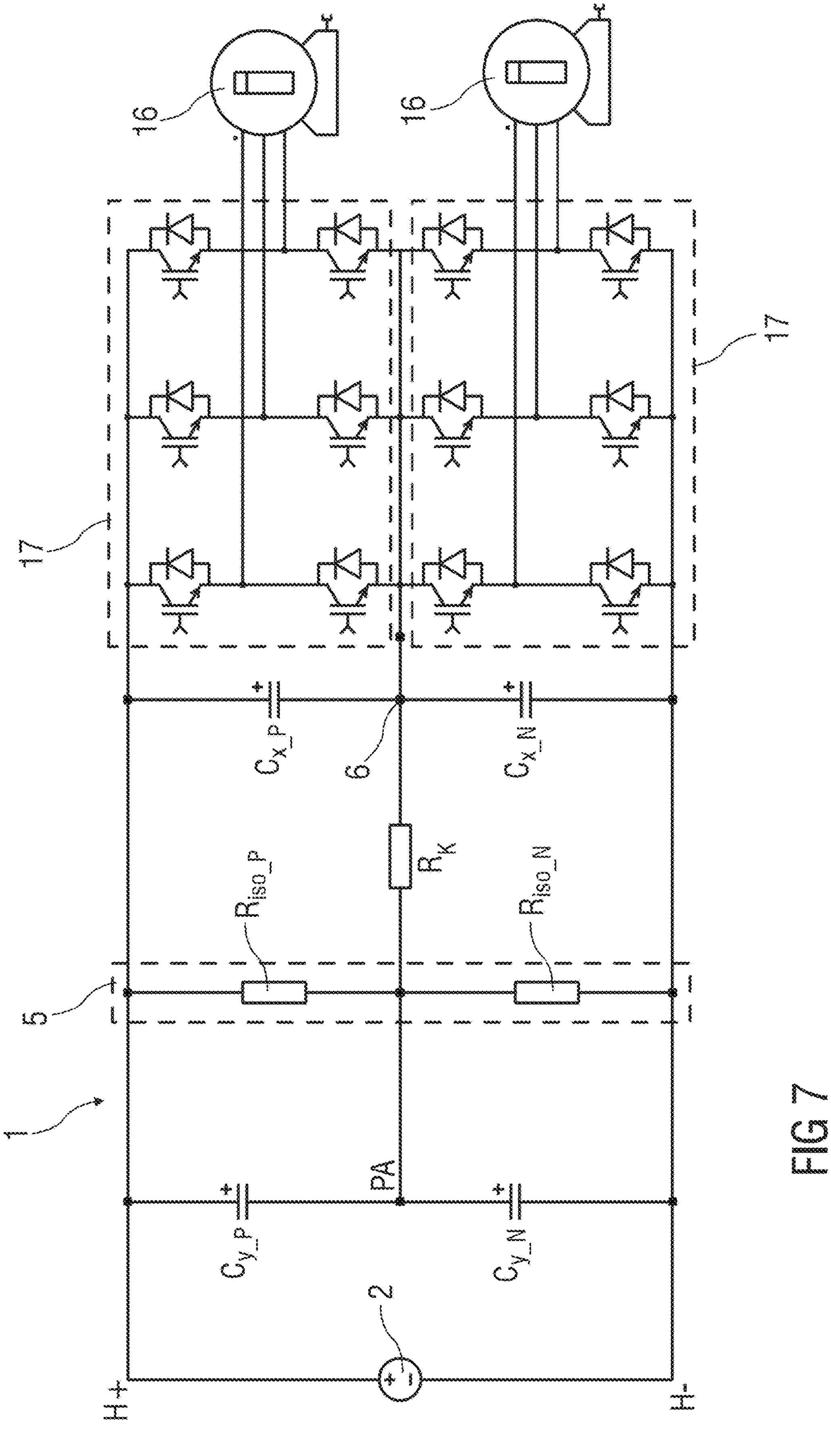
Figure 8:
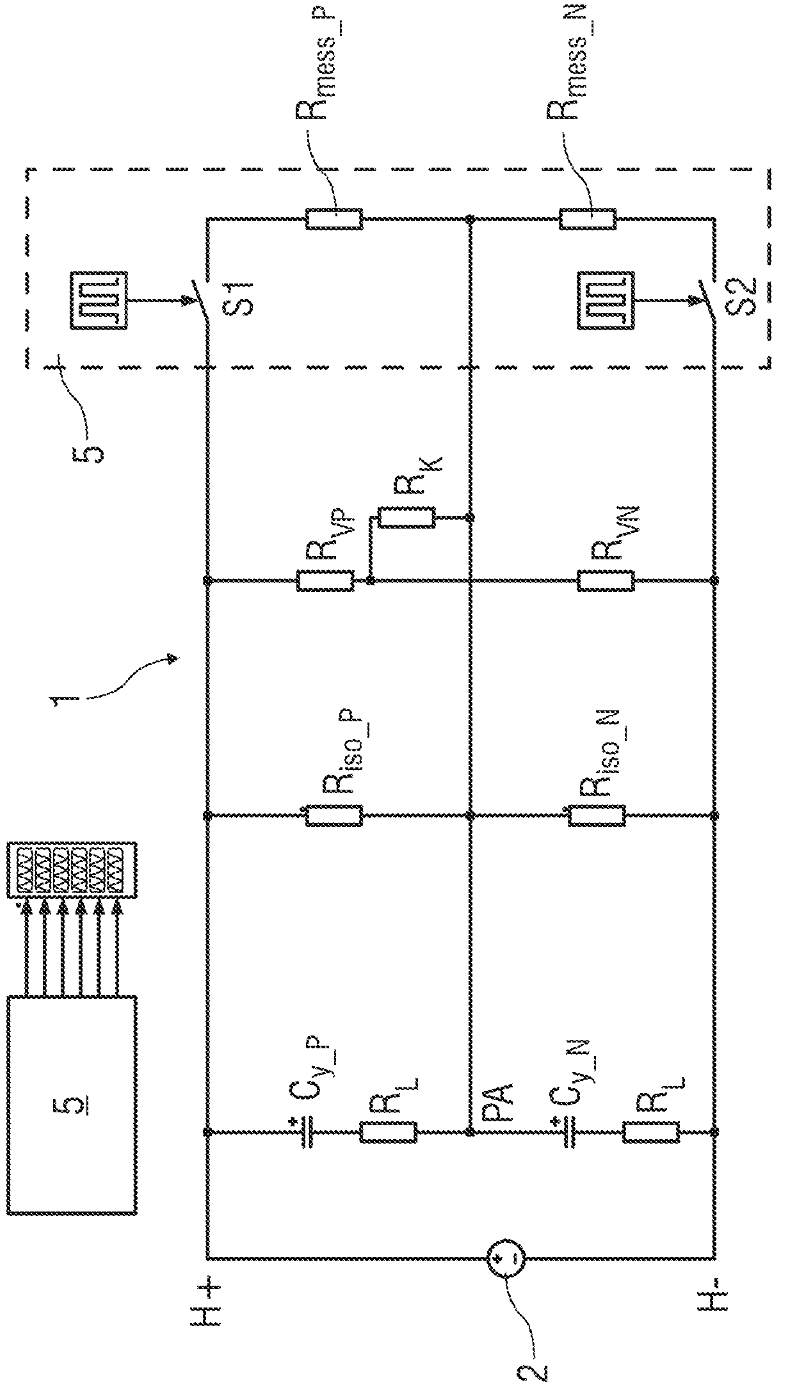
Figure 9:
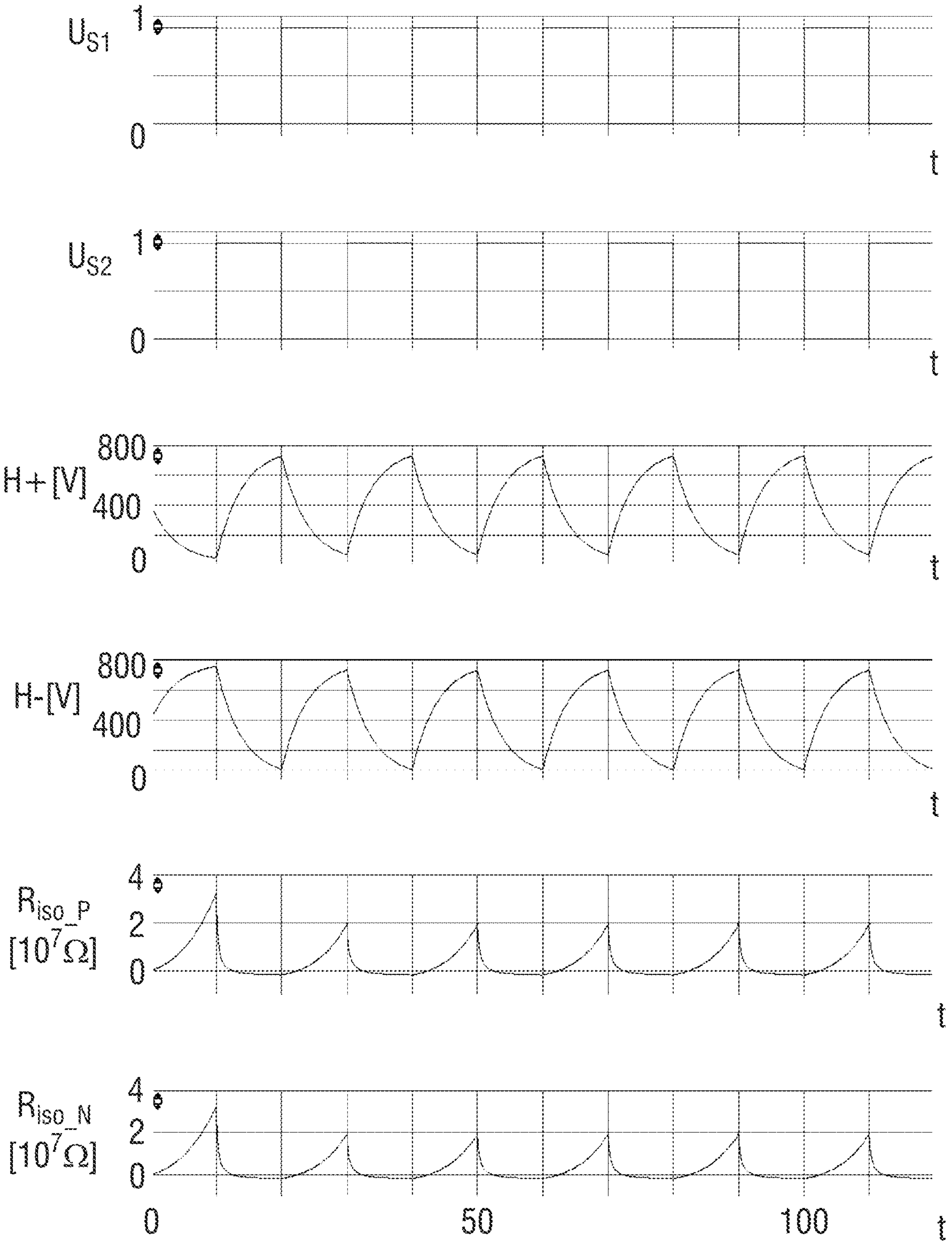
Figure 10:
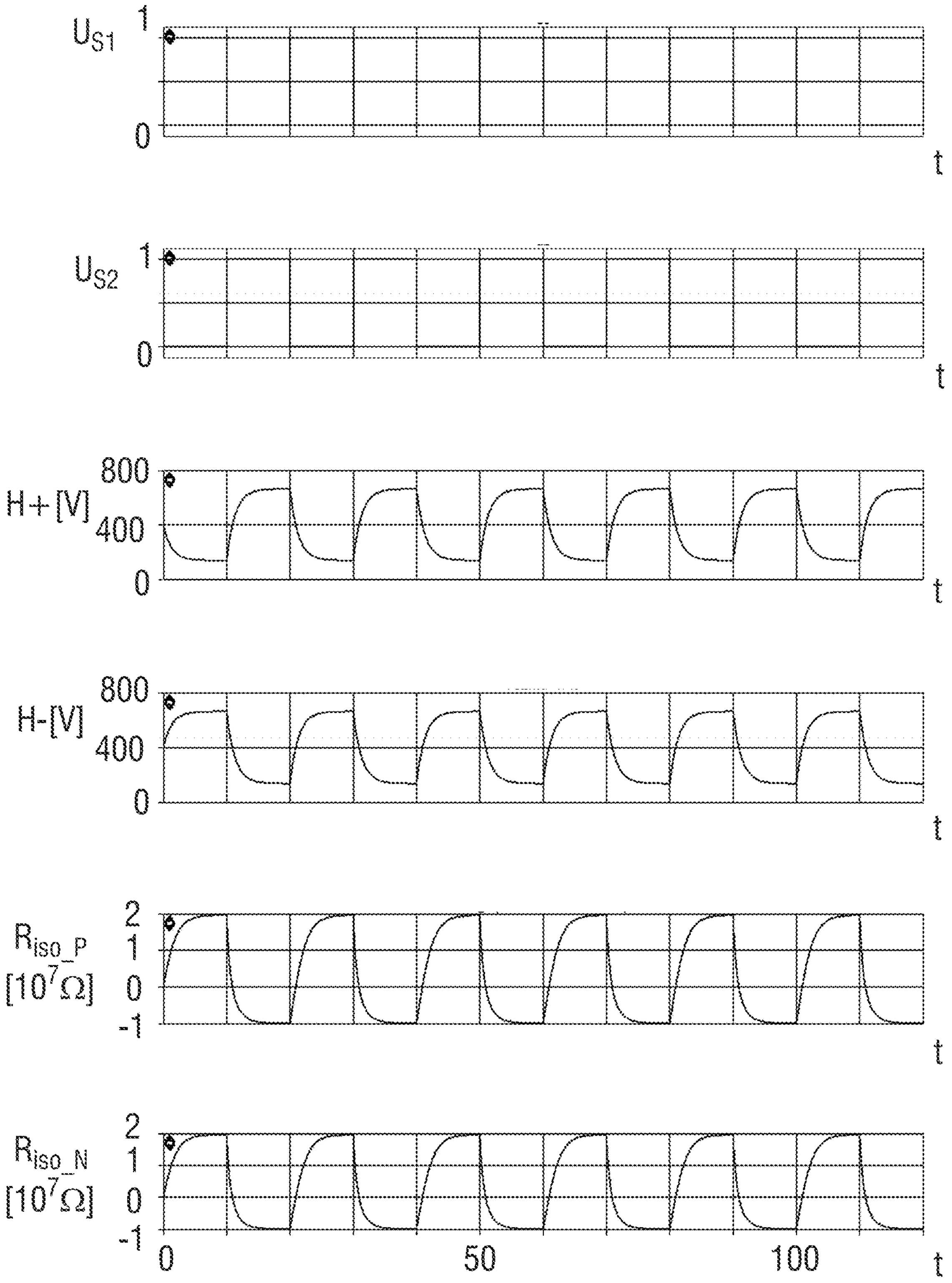

In the drawings:

FIG. 1 is a schematic view of a vehicle electrical system of a motor vehicle, FIG. 2 is a schematic view of an embodiment of a vehicle electrical system of a motor vehicle, FIG. 3 is a schematic view of a further embodiment of a vehicle electrical system of a motor vehicle, FIG. 4 is a schematic view of a further embodiment of a vehicle electrical system of a motor vehicle, FIG. 5 is a schematic view of a further embodiment of a vehicle electrical system of a motor vehicle, FIG. 6 is a schematic view of a further embodiment of a vehicle electrical system of a motor vehicle, FIG. 7 is a schematic view of a further embodiment of a vehicle electrical system of a motor vehicle, FIG. 8 is a schematic view of a simulation setup of an embodiment of a vehicle electrical system of a motor vehicle, FIG. 9 shows schematic diagrams illustrating simulation results for a simulation not comprising a coupling resistor, and FIG. 10 shows schematic diagrams illustrating simulation results for a simulation comprising a coupling resistor.

Corresponding parts are provided with the same reference signs in all drawings.

DETAILED DESCRIPTION

FIG. 1 is a schematic view of a vehicle electrical system 1 of a motor vehicle, for example an electrically powered motor vehicle.

The vehicle electrical system 1 is, for example, an HV (high-voltage) vehicle electrical system and typically comprises at least one HV battery 2 and HV loads 3, 4. As a rule, the vehicle electrical system 1 is galvanically isolated from a vehicle ground PA. Between a positive potential H+ and the vehicle ground PA and between a negative potential H− and the vehicle ground PA, there is an insulation resistance $R_{iso\_P}$, $R_{iso\_N}$ due to parasitic effects. For safety reasons, an insulation monitor 5 is provided that monitors the insulation resistances $R_{iso\_P}$, $R_{iso\_N}$. Furthermore, Y capacitors $C_{Y\_P}$, $C_{Y\_N}$ are provided between the positive potential H+ and the vehicle ground PA and between the negative potential H− and the vehicle ground PA.

Fluctuations in the vehicle electrical system 1, which are caused by the insulation monitor 5, which can be designed in particular as a resistance insulation monitor, can be reduced by using a voltage center tap 6 present in the vehicle electrical system 1 or in a component of the vehicle electrical system 1, for example an HV load 3, 4, which is symbolized in FIG. 1 by two load resistors $R_{VP}$ and $R_{VN}$ connected as voltage dividers. This voltage center tap 6 is connected to the vehicle ground PA via an ohmic coupling resistor $R_K$, which can comprise a fixed resistor $R_F$ and a variable resistor $R_V$. In the embodiment shown, the coupling resistor $R_K$ is designed as a series connection consisting of a fixed resistor $R_F$ and a variable resistor $R_V$.

In other embodiments, the voltage center tap 6 can also be formed by means of a capacitive voltage divider.

By coupling the voltage center tap 6 to the vehicle ground PA by means of the coupling resistor $R_K$, the influence of the insulation monitor 5 on the shift in potentials H+, H− relative to the vehicle ground PA is reduced. The insulation monitor 5 is not disturbed in its function when calculating the insulation value of the insulation resistances $R_{iso\_P}$, $R_{iso\_N}$, in particular if the value of the coupling resistor $R_K$ does not change during the measurement period of the insulation monitor 5. By only slightly shifting the potentials H+, H−, the energy content stored in the Y capacitors $C_{Y\_P}$, $C_{Y\_N}$ of the vehicle electrical system 1 can be reduced. This is advantageous for improving the filtering of active, in particular clocked, HV components and for vehicles with higher DC system voltages, for example 800 V. In addition, when coupling HV systems with different insulation designs, it is possible to avoid overloading the insulation of the weaker HV system. For example, the insulation of a 500 V charging station is protected when charging an 800 V vehicle via a galvanically coupled charging system.

As a result of the coupling resistor $R_K$, the insulation monitor 5 has a significantly shorter detection time because recharging processes are faster.

By using a series connection of a fixed resistor $R_F$ with a variable resistor $R_V$, higher insulation can be allowed if the HV system has a lower Y capacity $C_{Y\_P}$, $C_{Y\_N}$, for example if the vehicle is not connected to a DC charging station. If the Y capacity $C_{Y\_P}$, $C_{Y\_N}$ is higher, for example if the vehicle is connected to a DC charging station, the coupling resistor $R_K$ can be reduced by its variable resistor $R_V$ and the potential shift caused by the insulation monitor 5 is lower.

Examples of the possible use of an ohmic coupling between a voltage center tap 6 and the vehicle ground PA are:

series connection of HV voltage supplies for control boards, series connection of half-bridges and/or H-bridges, multilevel half-bridges, series connections of inverters, multilevel inverters, heating circuits with series connections of two or more heating elements, taps of connection points of battery module series connections.

Preferably, the impedances of series connections from HV loads 3, 4 or HV sources are significantly smaller compared to the coupling resistor $R_K$ and the measuring resistors of the insulation monitor 5. Since the measuring resistors $R_{mess\_p}$, $R_{mess\_n}$ and the coupling resistor $R_K$ can be in the range of several 100 kohms or even in the Mohm range, series connections from HV loads 3, 4 or HV sources do not require a large power consumption to represent a significantly lower impedance. In this respect, auxiliary voltage supplies are also suitable for this use. In the case of HV sources, the source impedance and/or the internal resistance must be taken into account. This is normally in the Mohm range and therefore also meets this requirement.

In the following drawings, instead of the series connection of a fixed resistor $R_F$ and a variable resistor $R_V$, only a single coupling resistor $R_K$ is shown. In any case, however, a series connection of a fixed resistor $R_F$ and a variable resistor $R_V$ can also be provided instead.

FIG. 2 is a schematic view of an embodiment of a vehicle electrical system 1 of a motor vehicle, for example an electrically powered motor vehicle. The embodiment according to FIG. 2 largely corresponds to the embodiment according to FIG. 1. However, the voltage center tap 6 is formed from a capacitive voltage divider consisting of two capacitors $C_{x\_P}$, $C_{x\_N}$ rather than load resistors.

In addition, the vehicle electrical system 1 is connected to a three-phase AC voltage connection 7 via a rectifier 8 with power factor correction (3-level PFC, for example a Vienna rectifier).

FIG. 3 is a schematic view of an embodiment of a vehicle electrical system 1 of a motor vehicle, for example an electrically powered motor vehicle. The embodiment according to FIG. 3 largely corresponds to the embodiment according to FIG. 1. However, the voltage center tap 6 is formed from a capacitive voltage divider consisting of two capacitors $C_{x\_P}$, $C_{x\_N}$ rather than load resistors.

In addition, the vehicle electrical system 1 is connected to a DC charging station 9, which is shown with Y capacitors $C_{y\_P1}$, $C_{y\_N1}$, insulation resistances $R_{iso\_P1}$, $R_{iso\_N1}$ similar to the vehicle electrical system 1 and with an output capacitor C, connected via a 3-level DC boost converter 11 in the vehicle, the capacitive voltage divider consisting of the two capacitors $C_{x\_P}$, $C_{x\_N}$ being arranged in the 3-level DC boost converter 11. Furthermore, the vehicle ground PA is connected to a ground PA' in the DC charging station 9 via a ground cable 12.

FIG. 4 is a schematic view of an embodiment of a vehicle electrical system 1 of a motor vehicle, for example an electrically powered motor vehicle. The embodiment according to FIG. 4 largely corresponds to the embodiment according to FIG. 1. However, the voltage center tap 6 is formed from a capacitive voltage divider consisting of two capacitors $C_{x\_P}$, $C_{x\_N}$ rather than load resistors.

In addition, the vehicle electrical system 1 is connected to a series connection of H bridges 13, 14, for example LV DC-DC converters or insulated DC-DC converters of a vehicle charger.

FIG. 5 is a schematic view of an embodiment of a vehicle electrical system 1 of a motor vehicle, for example an electrically powered motor vehicle.

The vehicle electrical system 1 comprises two HV batteries 2.1, 2.2 or battery strings connected in series and an HV load 3. The vehicle electrical system 1 is galvanically isolated from a vehicle ground PA. Between a positive potential H+ and the vehicle ground PA and between a negative potential H− and the vehicle ground PA, there is an insulation resistance $R_{iso\_P}$, $R_{iso\_N}$ due to parasitic effects. For safety reasons, an insulation monitor 5 is provided that monitors the insulation resistances $R_{iso\_P}$, $R_{iso\_N}$. Furthermore, Y capacitors $C_{Y\_P}$, $C_{Y\_N}$ are provided between the positive potential H+ and the vehicle ground PA and between the negative potential H− and the vehicle ground PA. The HV load 3 is connected between the positive potential H+ and the negative potential H−.

Fluctuations in the vehicle electrical system 1, which are caused by the insulation monitor 5, which can be designed, in particular, as a resistance insulation monitor, can be reduced by using a voltage center tap 6 present in the vehicle electrical system 1 or in a component of the vehicle electrical system 1, for example the HV batteries 2.1, 2.2, which are connected in series in FIG. 5 and whose internal resistors thus form a voltage divider. This voltage center tap 6 is connected to the vehicle ground PA via an ohmic coupling resistor $R_K$, which can comprise a fixed resistor $R_F$ and/or a variable resistor $R_V$.

FIG. 6 is a schematic view of an embodiment of a vehicle electrical system 1 of a motor vehicle, for example an electrically powered motor vehicle. The embodiment according to FIG. 6 largely corresponds to the embodiment according to FIG. 1. However, the voltage center tap 6 is formed from a capacitive voltage divider consisting of two capacitors $C_{x\_P}$, $C_{x\_N}$ rather than load resistors.

In addition, the vehicle electrical system 1 is connected to a 3-level inverter 15 for an electric machine 16. The 3-level inverter 15 can be designed, for example, as a 3-level NPC inverter, a T-type inverter, or a flying inverter.

FIG. 7 is a schematic view of an embodiment of a vehicle electrical system 1 of a motor vehicle, for example an electrically powered motor vehicle. The embodiment according to FIG. 7 largely corresponds to the embodiment according to FIG. 1. However, the voltage center tap 6 is formed from a capacitive voltage divider consisting of two capacitors $C_{x\_P}$, $C_{x\_N}$ rather than load resistors.

In addition, the vehicle electrical system 1 is connected to a series connection of two B&-bridge inverters 17 for two electrical machines 16.

FIG. 8 is a schematic view of a simulation setup of an embodiment of a vehicle electrical system 1 of a motor vehicle, for example an electrically powered motor vehicle. The embodiment according to FIG. 8 largely corresponds to the embodiment according to FIG. 1. Furthermore, two measuring resistors $R_{mess\_p}$, $R_{mess\_n}$ of the insulation monitor 5 are arranged between the positive potential H+ and the vehicle ground PA and between the negative potential H− and the vehicle ground PA so that they can be switched on by means of respective switches S1, S2. Also shown are line resistors $R_L$ in series with the Y capacitors $C_{Y\_P}$, $C_{Y\_N}$, which are inevitably present in real components and therefore must be taken into account in the simulation, even if only with a very low resistance value of, for example, 0.01 ohms.

The following simulation parameters were used:

$R_{iso\_p}=10^8$ ohms $R_{iso\_n}=10^8$ ohms $R_{mess\_p}=R_{mess\_n}=2*10^6$ ohms

Frequency $f=1/20$ Hz

Voltage U=800 V $R_{VP}=U*U/1000$ $R_{VN}=U*U/1000$

FIG. 9 shows schematic diagrams illustrating switching positions $U_{S1}$, $U_{S2}$ of the switches S1, S2, the potentials H+, H− and the calculated insulation resistances $R_{iso\_P}$, $R_{iso\_N}$ over time t for a simulation not comprising the coupling resistor $R_K$.

Due to the well-insulated HV vehicle electrical system 1, the insulation monitor 5, in particular a resistance insulation monitor, causes a significant shift in the potentials H+, H−. The Y capacitors $C_{Y\_P}$, $C_{Y\_N}$ thus absorb a voltage that almost corresponds to the voltage of the HV battery 2. The energy content thereof is accordingly very high. The recharging time is quite slow due to the high-impedance resistors and in this example the recharging process is not yet completed within the cycle time of the insulation monitor 5.

FIG. 10 shows schematic diagrams illustrating switching positions $U_{S1}$, $U_{S2}$ of the switches S1, S2, the potentials H+, H− and the calculated insulation resistances $R_{iso\_P}$, $R_{iso\_N}$ over time t for a simulation comprising a coupling resistor $R_K$ of $10^6$ ohm.

The simulation shows that the potentials H+, H− fluctuate less significantly than in a system without a coupling resistor $R_K$ at the voltage center tap 6. The maximum potential H+, H− is 531 V, the minimum potential H+, H− is 269 V. The energy content in the Y capacitors $C_{Y\_P}$, $C_{Y\_N}$ is therefore significantly reduced. Due to the relatively low coupling resistance $R_K$ compared to the insulation resistances $R_{iso\_P}$, $R_{iso\_N}$, the recharging process can take place much faster. The insulation monitor 5 can therefore detect insulation faults in a shorter time.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Vehicle electrical system
2 HV battery
2.1, 2.2 HV battery
3 HV load
4 HV load
5 Insulation monitor
6 Voltage center tap
7 Three-phase AC voltage connection
8 Rectifier
9 DC charging station
11 3-level DC boost converter
12 Ground cable
13 H-bridge
14 H-bridge
15 3-level inverter
16 Electric machine
17 B&-bridge inverter
C Output capacitor
$C_{x\_P}$, $C_{x\_N}$ capacitor
$C_{Y\_P}$, $C_{Y\_N}$ Y capacitor
$C_{y\_P1}$, $C_{y\_N1}$ Y capacitor
H+, H− Potential
PA Vehicle ground
PA' Ground
$R_F$ Fixed resistor
$R_{iso\_P}$, $R_{iso\_N}$ Insulation resistance
$R_K$ Coupling resistor
$R_L$ Line resistor
$R_{mess\_p}$, $R_{mess\_n}$ Measuring resistor
$R_V$ Variable resistor
$R_{VP}$, $R_{VN}$ Load resistor
$R_{iso\_P1}$, $R_{iso\_N1}$ Insulation resistance
S1, S2 Switch
t Time
$U_{S1}$, $U_{S2}$ Switching position

The invention claimed is:

1. A vehicle electrical system for a motor vehicle, the vehicle electrical system comprising:

at least one high voltage (HV) battery configured to provide a positive potential and a negative potential;
at least one HV load;
an insulation monitor configured to monitor insulation resistances to a vehicle ground galvanically isolated from the vehicle electrical system between the positive potential and the vehicle ground and between the negative potential and the vehicle ground;
a first Y capacitor arranged between the positive potential and the vehicle ground;
a second Y capacitor arranged between the negative potential and the vehicle ground;
a voltage center tap arranged between the positive potential and the negative potential of the at least one HV battery, wherein the voltage center tap is arranged between two resistors connected as voltage dividers or is formed by a capacitive voltage divider and is connected to the vehicle ground by an ohmic coupling resistor, wherein the voltage center tap is part of the vehicle electrical system or is in a component of the vehicle electrical system,
wherein the ohmic coupling resistor is a series connection consisting of a fixed resistor and a variable resistor.

2. The vehicle electrical system of claim 1, wherein the two resistors of the voltage divider are configured as high voltage loads connected in series, or
internal resistors of at least two high voltage batteries connected in series.

3. The vehicle electrical system of claim 2, wherein the two resistors of the voltage divider are significantly smaller compared to the ohmic coupling resistor and measuring resistors of the insulation monitor, wherein the insulation monitor is a resistance insulation monitor.

4. The vehicle electrical system of claim 3, wherein the measuring resistors and the ohmic coupling resistor have a resistance value greater than 100 kohms.

5. The vehicle electrical system of claim 1, wherein at least one of the following is coupled to the vehicle ground via the coupling resistor:

a series connection of HV voltage supplies for control boards,
a series connection of half-bridges or H-bridges,
a multilevel half-bridge,
a series connection of inverters,
a multilevel inverter,
a heating circuit with series connections of two or more heating elements, or
a tap of a connection point of battery module series connections.

6. A vehicle comprising:

a vehicle electrical system, which comprises
at least one high voltage (HV) battery configured to provide a positive potential and a negative potential;
at least one HV load;
an insulation monitor configured to monitor insulation resistances to a vehicle ground galvanically isolated from the vehicle electrical system between the positive potential and the vehicle ground and between the negative potential and the vehicle ground;

a first Y capacitor arranged between the positive potential and the vehicle ground;

a second Y capacitor arranged between the negative potential and the vehicle ground;

a voltage center tap arranged between the positive potential and the negative potential of the at least one HV battery, wherein the voltage center tap is arranged between two resistors connected as voltage dividers or is formed by a capacitive voltage divider and is connected to the vehicle ground by an ohmic coupling resistor, wherein the voltage center tap is part of the vehicle electrical system or is in a component of the vehicle electrical system, wherein the ohmic coupling resistor is a series connection consisting of a fixed resistor and a variable resistor.

7. A method for operating a vehicle a vehicle electrical system, which comprises at least one high voltage (HV) battery configured to provide a positive potential and a negative potential, at least one HV load, an insulation monitor configured to monitor insulation resistances to a vehicle ground galvanically isolated from the vehicle electrical system between the positive potential and the vehicle ground and between the negative potential and the vehicle ground, a first Y capacitor arranged between the positive potential and the vehicle ground, a second Y capacitor arranged between the negative potential and the vehicle ground, a voltage center tap arranged between the positive potential and the negative potential of the at least one HV battery, wherein the voltage center tap is arranged between two resistors connected as voltage dividers or is formed by a capacitive voltage divider and is connected to the vehicle ground by an ohmic coupling resistor, wherein the voltage center tap is part of the vehicle electrical system or is in a component of the vehicle electrical system, wherein the ohmic coupling resistor is a series connection consisting of a fixed resistor and a variable resistor, the method comprising:

setting a first resistance value of the variable resistor when the vehicle is not connected to a DC charging station; and setting a second resistance value of the variable resistance when the vehicle is connected to a DC charging station, wherein the second resistance value is lower than the first resistance value.

* * * * *